United States Patent
Franz et al.

(10) Patent No.: US 10,970,265 B2
(45) Date of Patent: Apr. 6, 2021

(54) ENHANCED TABLE FUNCTIONS FOR DATABASE MANAGEMENT SYSTEMS

(71) Applicant: SAP SE, Walldorf (DE)

(72) Inventors: Gerald Franz, Walldorf (DE); Hannes Jakschitsch, Walldorf (DE); Roland Sedler, Leimen (DE); Bastian Erler, Walldorf (DE)

(73) Assignee: SAP SE, Walldorf (DE)

( * ) Notice: Subject to any disclaimer, the term of this patent is extended or adjusted under 35 U.S.C. 154(b) by 492 days.

(21) Appl. No.: 15/418,479

(22) Filed: Jan. 27, 2017

(65) Prior Publication Data
US 2018/0218018 A1    Aug. 2, 2018

(51) Int. Cl.
*G06F 16/00* (2019.01)
*G06F 16/22* (2019.01)
*G06F 16/242* (2019.01)

(52) U.S. Cl.
CPC ...... *G06F 16/2282* (2019.01); *G06F 16/2433* (2019.01)

(58) Field of Classification Search
CPC ............. G06F 16/2453; G06F 16/2455; G06F 16/2282; G06F 16/2433
See application file for complete search history.

(56) References Cited

U.S. PATENT DOCUMENTS

| | | | |
|---|---|---|---|
| 6,721,725 B2 * | 4/2004 | Levy | G06F 16/24565 |
| 2009/0265335 A1 * | 10/2009 | Hoffman | G06F 16/283 |
| 2012/0078951 A1 * | 3/2012 | Hsu | G06F 16/24532 |
| | | | 707/769 |
| 2012/0130963 A1 * | 5/2012 | Luo | G06F 16/2443 |
| | | | 707/693 |

\* cited by examiner

*Primary Examiner* — Hung Q Pham
(74) *Attorney, Agent, or Firm* — Mintz Levin Cohn Ferris Glovsky and Popeo, P.C.

(57) ABSTRACT

A table function can be received at a database system and applied to one or more data sources. The table function can have one or more generic input operators associated with a source data type of the one or more data sources. One or more output operators associated with a return set of data of the table function can be determined at function call compile time from the values passed to one or more generic input operators. The determining of the one or more output parameters can be based on one or more rules specified in the table function definition. The one or more output operators for the table function can be generated at function call compile time.

14 Claims, 12 Drawing Sheets

FIG. 1

Example 1:
create column table T_A (i integer, j integer, k nvarchar(3) );
create column table T_B (m integer, n integer, k nvarchar(3) );

select * from T_A inner join T_B on T_A.k = T_B.k

| Resultset | |
|---|---|
| Column ID | Datatype |
| T_A.I | Integer |
| T_A.J | Integer |
| T_A.K | Nvarchar(3) |
| T_B.M | Integer |
| T_B.N | Integer |
| T_B.K | Nvarchar(3) |

Example 2:
create column table T_C (a float, b raw(5) );
create column table T_D (c raw(5), d decimal(8,4) );

select * from T_C inner join T_D on T_C.b = T_D.c

| Resultset | |
|---|---|
| Column ID | Datatype |
| T_C.A | Float |
| T_C.B | Raw(5) |
| T_D.C | Raw(5) |
| T_D.D | Decimal(8,4) |

Example 1: A generic series generate function

CREATE GENERIC FUNCTION SERIES_GENERATE ( IN minvalue ANY, IN step any, IN maxvalue any )
RETURNS TABLE ( generated_period_start TYPE LIKE minvalue, generated_period_end TYPE LIKE minvalue, element_number BIGINT, fraction_of_min_max_range DOUBLE ) )

INDEX DATA — 702

| Rank | Tree size | Parent Rank | Level | Node Flags | Parent ID | Node ID |
|---|---|---|---|---|---|---|
| 1 | 10 | 0 |  | 0 | null | A1 |
| 2 | 3 | 1 | 1 | 0 | A1 | B1 |
| 3 | 1 | 2 | 2 | 0 | B1 | C1 |
| 4 | 1 | 2 | 3 | 0 | B1 | C2 |
| 5 | 6 | 1 | 3 | 0 | A1 | B2 |
| 6 | 3 | 5 | 2 | 0 | B2 | C3 |
| 7 | 1 | 6 | 3 | 0 | C3 | D1 |
| 8 | 1 | 6 | 4 | 0 | C3 | D2 |
| 9 | 2 | 5 | 4 | 0 | B2 | C4 |
| 10 | 1 | 9 | 3 | 0 | C4 | D3 |

708 710 712 714 716

SOURCE DATA — 706

| Parent ID | Node ID |
|---|---|
| null | A1 |
| A1 | B1 |
| B1 | C1 |
| B1 | C2 |
| A1 | B2 |
| B2 | C3 |
| C3 | D1 |
| C3 | D2 |
| B2 | C4 |
| C4 | D3 |

Hierarchy traversal in pre-order

-- Preparation begin
drop table hierarchy_src cascade;
create column table hierarchy_src ( parent_id integer, node_id integer, custom_node_value integer);
insert into hierarchy_src values ( NULL, 1, 100);
insert into hierarchy_src values ( 1, 2, 200 );

drop table start_nodes cascade;
create column table start_nodes (start_rank bigint, custom_start nvarchar(10) );
insert into start_nodes values ( 1, 'xxx' );
-- Preparation end

→ 902

→ 910

WITH myhierarchy AS (select * from HIERARCHY(SOURCE hierarchy_src  ORPHANS ignore CACHE none, DEPTH 999)

→ 904

SELECT start_rank, custom_start, hierarchy_rank, custom_node_value, node_id FROM HIERARCHY_DESCENDENTS(
SOURCE myhierarchy
START (SELECT * from start_nodes )
MAX_DISTANCE 999)

→ 906

→ 908

→ 912

START_RANK;CUSTOM_START;HIERARCHY_RANK;CUSTOM_NODE_VALUE;NODE_ID
1;xxx;1;100;1
1;xxx;2;200;2

ENHANCED TABLE FUNCTIONS FOR DATABASE MANAGEMENT SYSTEMS

TECHNICAL FIELD

The subject matter described herein relates to enhanced table functions in database languages for database management systems.

BACKGROUND

The demand for ad-hoc and real-time data analyses by many users simultaneously is increasing in the same way that the data quantities to be processed are increasing. To keep pace with the competition in the current economic climate, it is crucial to have the latest information about processes within an organization (e.g. a company) and/or in the market to be able to make the right decisions promptly.

Data can be hierarchical where one superordinate data item may depend on one or many subordinate data items. Operations can be performed on a data hierarchy to glean on or more desired pieces of information about the hierarchical data.

SUMMARY

In one aspect, a method is provided. The method can include one or more of the following operations. The operations can be implemented by at least one processor. A table function can be received. The table function can be configured to be applied to one or more data sources of a database. The table function can have one or more generic input operators associated with a source data type of the one or more data sources. One or more output operators associated with a return set of data of the table function can be determined. The determining of the one or more output operators can be performed at compile time for the table function. The one or more output operators can be generated from the one or more generic input operators based on one or more rules of the table function. The one or more output operators for the table function can be generated at compile time for the function.

In some variations, the table function is a Standard Query Language (SQL) table function. The table function can generate a start node table defining the start node for a navigation through a hierarchy of nodes. An output of the table function can include a hierarchy of descendant nodes of the start node. The table function can be a hierarchy navigation function. The table function can be a hierarchy generator function. The table function can be configured to allow customization of one or more input parameters of the table function. In some variations, the operations can include traversing a node hierarchy in accordance with the hierarchy navigation function.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

The presently described subject matter is directed toward genericized SQL table functions making the SQL table functions flexible compared to their prior counterparts. Typical SQL table functions require input operators identifying fixed source data type and output operators identifying the fixed data type of a return set of data to be specified by a database developer. The presently described subject matter provides SQL table functions that do not require a database developer to specify fixed input and output operations.

Instead, the input and output operators can be declared generic and the system resolves the specific datatypes at function call compile time.

The examples provided herein include flexible Structured Query Language (SQL) functions, however, this is exemplary only. The presently described subject matter can apply to different database programming languages.

Database programming languages, such as SQL, provide flexible operations of databases, but they have their limitations. For example, the "join" clause can accept two database tables as input and produce one table as an output. The "join" clause in the SQL database language is generic. The "join" clause can work on any table layout. However, the "join" clause is an example of a language element that is hardcoded into SQL. It cannot be modified or extended by database engineers to perform additional or extended functions.

Database engineers can generate user-defined functions which can provide additional functionality to database language functions, such as SQL functions, without the need to extend the database language itself. However, these user-defined functions require a fixed input and output signature to operate. A fixed signature can reference a predefined number of columns, names of columns, datatype, or the like.

An example of a table function can be a hierarchy generator for a hierarchy topology, navigation functions for a hierarchy topology, or the like. To avoid requiring specialized individual implementations for each data source, the SQL table functions, therefore, need to be capable of handling a wide array of data sources and data types. Providing specialized implementations of the SQL table functions for every single data set would be impractical in a commercial setting because each time new data set would require software engineers to generate new SQL table functions.

Figure 1:
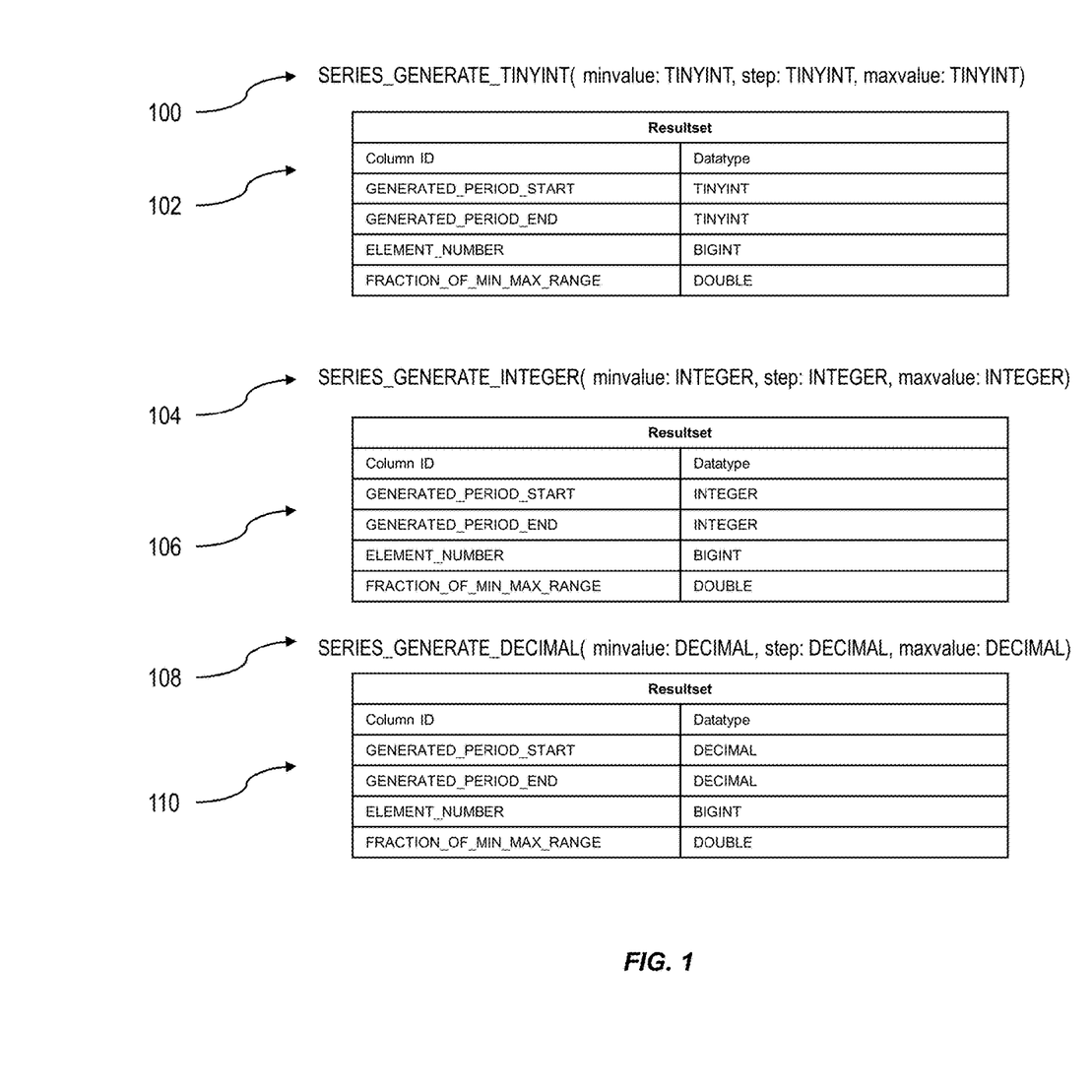
FIG. 1 is an illustration of standard database language functions

FIG. 1 is an illustration of standard database language functions. These standard database language functions implement almost the same behavior (they emit a number range according to the given input parameters). As shown in FIG. 1, every possible data type of the input requires a separate function to be coded. This means a database engineer is required to know the data type beforehand and code for it accordingly. FIG. 1 shows a TINYINT SQL function 100 and its result set 102, an INTEGER SQL function 104 and its result set 106, and a DECIMAL SQL function 108 and its result set 110. The datatypes of the result columns GENERATED_PERIOD_START and GENERATED_PERIOD_END correspond to the datatype of the input parameters MINVALUE, STEP, and MAXVALUE. For different source data types, a database engineer would be required to develop specialized individual SQL table functions for the SERIES_GENERATE functionality.

The presently described solution includes an enhancement to the database language to allow for database language functions that are flexible as to the signature of the input data and output data. The enhancement to the database language includes providing the ability for database engineers to generate database language functions that are generic as to the input data and the output data. The enhanced database language can allow user-defined database language functions to have similar generic functionality to SQL's "join" clause without having to extend the database language itself. Therefore, additional functionality can be added to the database without having to rework the underlying database language.

Figure 2:
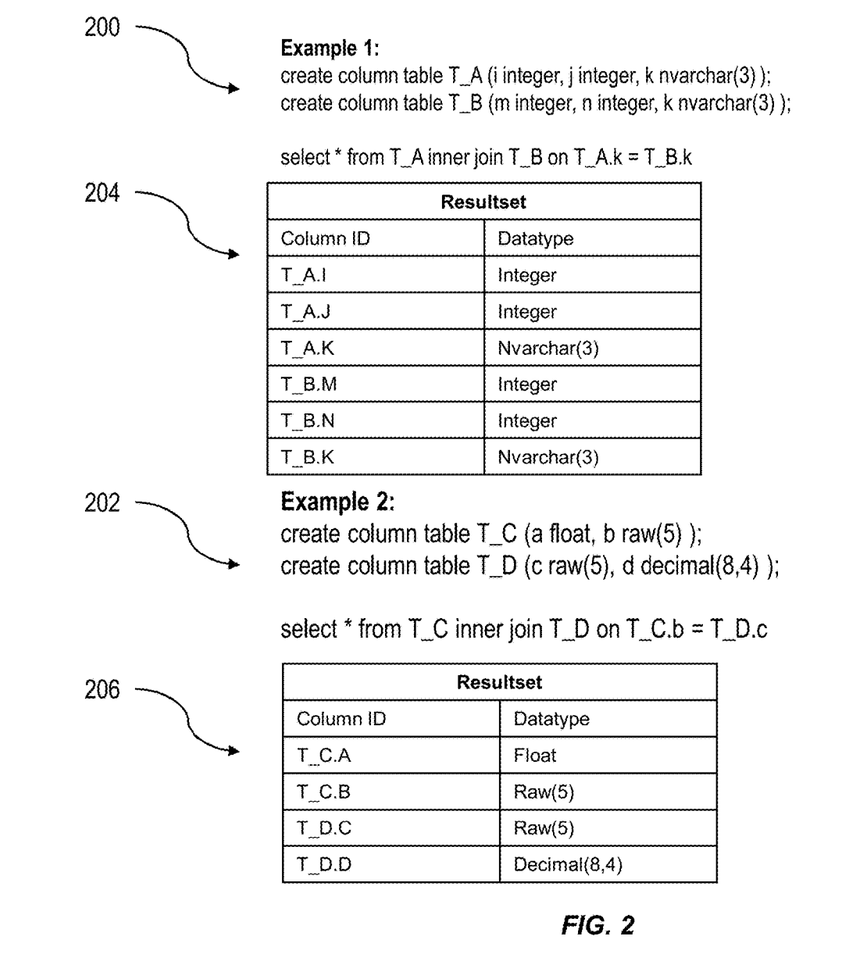
FIG. 2 is an illustration of an application of the "join" clause of SQL.

FIG. 2 is an illustration of the "join" clause of SQL. The syntax 200 and syntax 202 that both use the "join" clause illustrate how the same syntax can be used for tables with different data layouts. The syntax 200 joins Table A with Table B. Table A and Table B have different columns. Similarly, syntax 202 joins Table C and Table D. Table C and Table D have different columns. However, the same syntax is used to join Table A with Table B as is used to join Table C and Table D. FIG. 2 illustrates the result set 204 of the syntax 200 and result set 206 of syntax 202.

Figure 3:
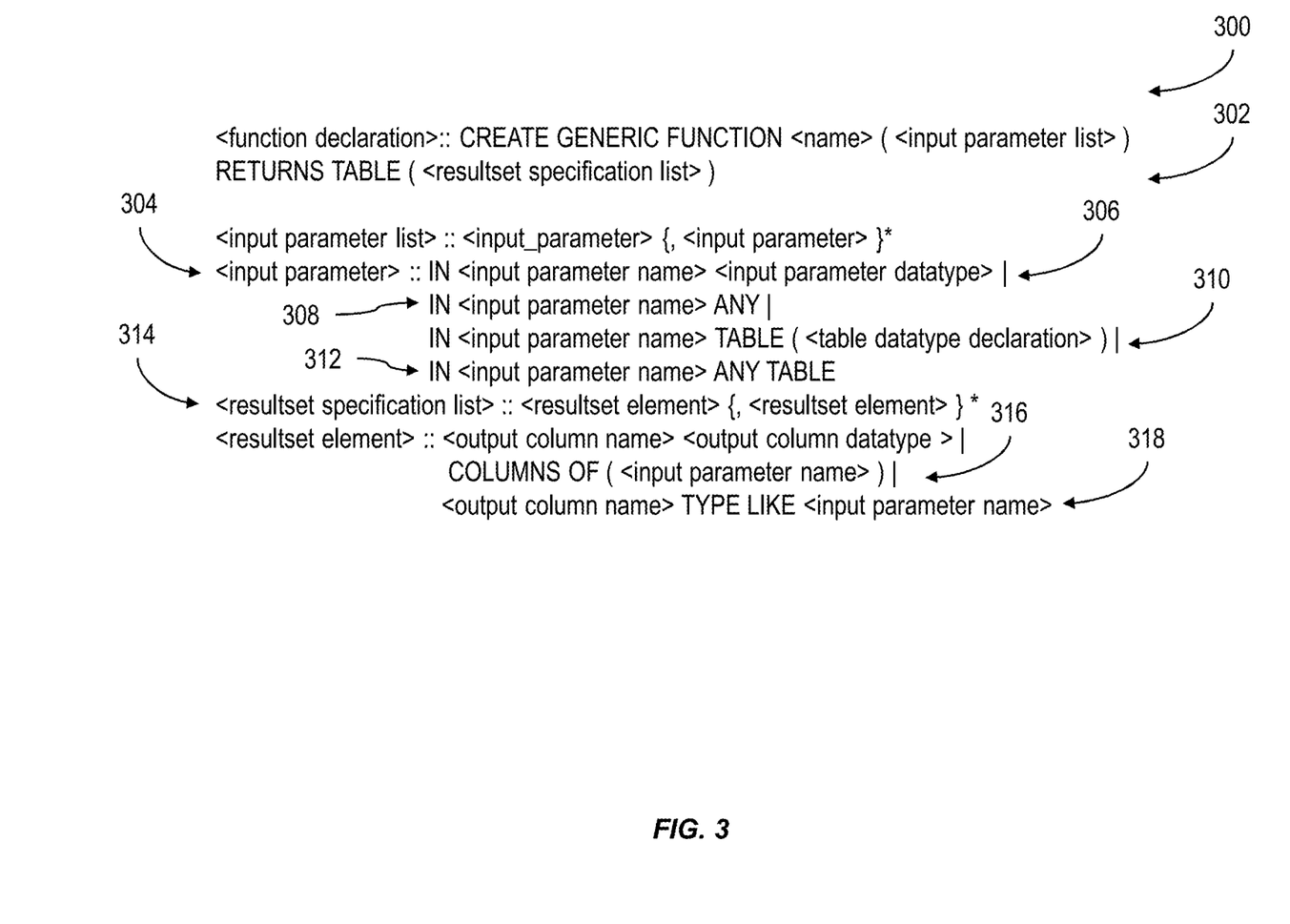
FIG. 3 is a conceptual example of a declaration syntax grammar for generic SQL functions having one or more features consistent with the present subject matter.

FIG. 3 is a conceptual example of a syntax grammar for declaration of a generic SQL function 300 having one or more features consistent with the present subject matter. This example syntax grammar allows the specification of a generic SQL function 300 that includes fixed input parameters and/or generic input parameters, as well as fixed and/or generic output parameters. This syntax is for illustrative purposes only. Other syntax or technical methods may be used to add a generic function(s) to the database system (e.g., general functions could be declared by program code within the database system itself, rather than be specified by a textual representation).

At 302, the generic SQL function is declared and a return type is declared.

At 304, the syntax for declaring input parameters for an SQL function is given. The input parameters can include non-generic parameters 306 and generic parameters 308. The input parameters can include a call to a non-generic table 310 with a known data type. The input parameters can include a call to a generic table 312 with a generic data type.

At 314, the syntax for specifying the output for the generic SQL function is given. The output is already declared as a table at 302. The output for the generic SQL can be declared 314 to include the identity of the columns of tables which are passed to the generic tabular input parameters 316 or can be declared to use the data types 318 of values passed to non-tabular input parameters The individual output data type for a call to the generic SQL function 300 can be determined at compile time. At compile time, the compiler can evaluate one or more rules which have been specified in the function declaration and which determine how the output 300 has to be derived from the input provided at 304. The output for the SQL function 300 can use the same column identities and data types for the output table columns as the input parameters of a call to the generic SQL function 300 provide, at compile time.

Figure 4:
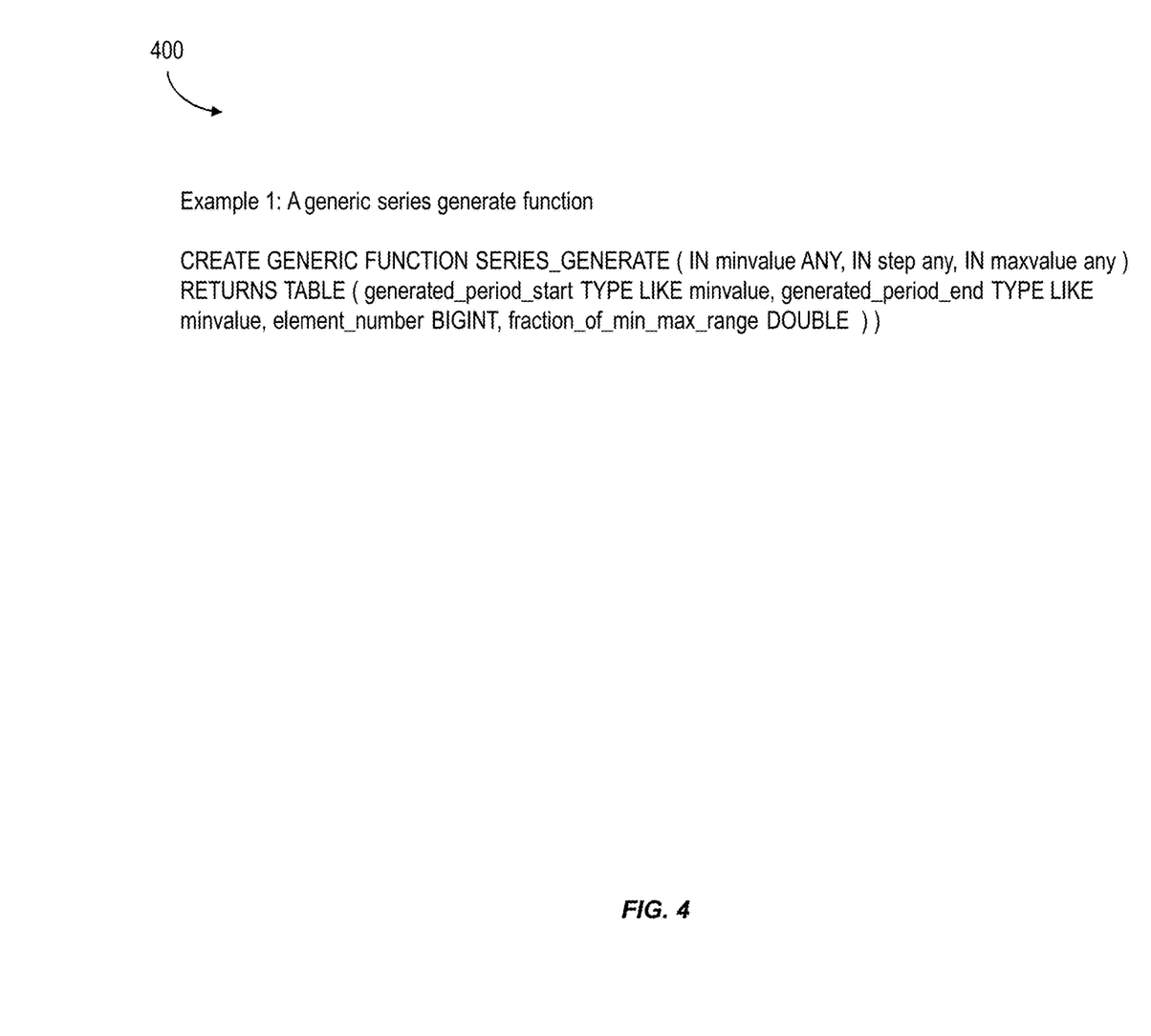
FIG. 4 is an illustration of an example of a generic series generate SQL function, having one or more features consistent with the present description.

FIG. 4 is an illustration of an example of a generic series generate SQL function 400, having one or more features consistent with the present description. The generic series generate SQL function 400 includes generic return data set including parameters of generated_period_start and generated_period_end. The datatypes of generated_period_start and generated_period_end would be inherited from the minvalue input parameter. This is indicated due to the datatype being called by "TYPE LIKE minvalue" in the definition of the return data set. The datatypes of the element_number column and the fraction_of_min_max_range result columns are fixed, indicated by the BIGINT and DOUBLE definitions in the definition of the return data set. Having one generic function is more efficient than having to manually provide multiple functions, as shown in FIG. 1.

At compile time, when a generic SQL function is called by a caller, the compiler that compiles the generic SQL function needs to be able to determine the identity and datatype of all elements in the return dataset of the generic SQL function, based on the input parameters of the generic SQL function. The caller can provide the specific value (and therefore the specific data type) to the compiler so that the compiler is able to determine the data values and data type of the result data set of the generic SQL function.

SERIES_GENERATE returns a list of numbers, which is an enumeration of the numbers between the interval given by the from and to parameter. Prior SQL functions require a fixed datatype. Therefore, it is not possible to provide a single SERIES_GENERATE function which supports all datatypes, but instead, a family of SERIES_GENERATE XXX functions can be used, where XXX is the datatype name, and each member of the SQL function family has a specific fixed return type. Consequently, many different legacy SERIES_GENERATE_XXX functions (all with different name and different signature) would be required, one for each numeric datatype in the database system.

As an example, if a function would have to be provided which has three different input parameters and each input parameter needs to support N different datatypes, then N*N*N individual implementations of the function would need to be provided if no generic functions were available. With generic SQL functions, one implementation of a generic SQL function can be sufficient to provide the same or similar functionality as N*N*N non-generic SQL functions.

When the generic series generate SQL function 400 is executed an internal check can be performed to determine that the datatypes of the provided values for minvalue, step and maxvalue are the same. This is because the semantics for the standard, non-generic, SERIES_GENERATE_function demand that the datatypes of minvalue, step and maxvalue be the same. At compile time, the generated_period_start and the _generated_period_end datatypes are set and based on the input parameters of minvalue and maxvalue.

A generic SQL function can be referred to as an SQL function having a generic signature as to input and output data type. The signature of the generic SQL function can be determined at compile time when the SQL function is called.

One exemplary application of a flexible SQL function can include hierarchy navigation functions in a node hierarchy of one or more sources of data in a database. Because hierarchies need to be defined on many different source data types, the hierarchy generation functions and hierarchy navigations should be implemented as generic functions.

Figure 5:
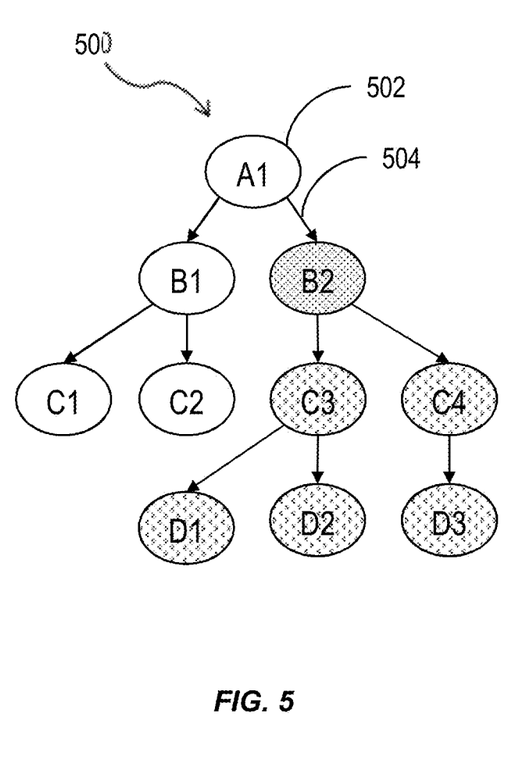
FIG. 5 is an illustration of a tree hierarchy in a database system having one or more features consistent with the present description.

FIG. 5 is an illustration of a tree hierarchy 500 in a database system having one or more features consistent with the present description. To introduce the presently described enhanced table functions, a description of the exemplary tree hierarchies that require these enhanced table functions is provided. A tree hierarchy 500 is a tree-like structure consisting of hierarchy nodes 502. The hierarchy nodes can be connected by edges 504. Except for the start node, A1, each node has a parent node and is, itself, a child of a parent node. For example, node B1 is a child node of node A1, and nodes C1 and C2 are child nodes of node B1. A child node has an effect on the parent node. For example, a parent node may represent an airline alliance and a child node may represent a particular airline. The tree hierarchy 500 represents the logic that the particular airline belongs to the airline alliance. The child node in this case affects the parent node by showing that the particular airline is part of the airline alliance. The airline node may have child nodes indicating aircrafts or routes. Similarly, the airline alliance may have a parent node representing the airline industry, or the like.

Each node 502 can represent a data item that is logically connected to the other nodes that it connects with. For example, node A1 may represent an organization, say a supermarket. Node B1 may represent a region or division of that supermarket. Node C1 may represent an individual store within the region or division represented by node B1.

Tree hierarchies 500 can be generated from relational source data. In some variations, the source data may be one or more database tables, or portions thereof. In other variations, the source data may be the results of one or more queries involving one or more database tables, or portions thereof. Hierarchical source data is usually stored on the database in a format that models the hierarchical structure, but does not include additional index data for fast hierarchical queries, because this index data would need to be consistently updated on modification of the source data with additional cost and programming complexity. Tree hierarchies 500 are particularly useful in comparing alternative solutions to a problem. Tree hierarchies 500 are also useful in facilitating determination of a magnitude of an issue.

Various analytics may be performed on a tree hierarchy 500 to obtain information about the tree hierarchy 500. For example, it may be beneficial to know the distance, or number of nodes, between a start node and a result node. A start node can be a node at the start of a navigation through a hierarchy. A result node can be the node at the end of a navigation through a hierarchy. A result node is not necessarily at the end of a branch of the tree of a tree hierarchy 500. In some variations, the result of a particular hierarchy analysis may be limited to a higher-level abstraction of information. For example, if the tree hierarchy 500 represents a supermarket business, the first node, node A1, may represent the supermarket company, and this may be the start node. The tree hierarchy 500 may include nodes that represent individual employees of the supermarket company. However, the analysis may only call for a result node that ends at the individual supermarket level, which may be several levels above that of the individual employee nodes.

Similar analytics are performed on tree hierarchies across many different industries and for many different purposes. Tree hierarchies may be populated using inconsistently formatted source data and/or from diverse source topologies. The source data may include "corner cases" which are cases where the node relations as given by the source data do not follow the classic tree topology. To analyze such source data, a developer would be required to understand each of the "corner cases," the formatting of each of the source data, the topologies of each of the source data, and account for those issues when developing hierarchy functions.

Figure 6:
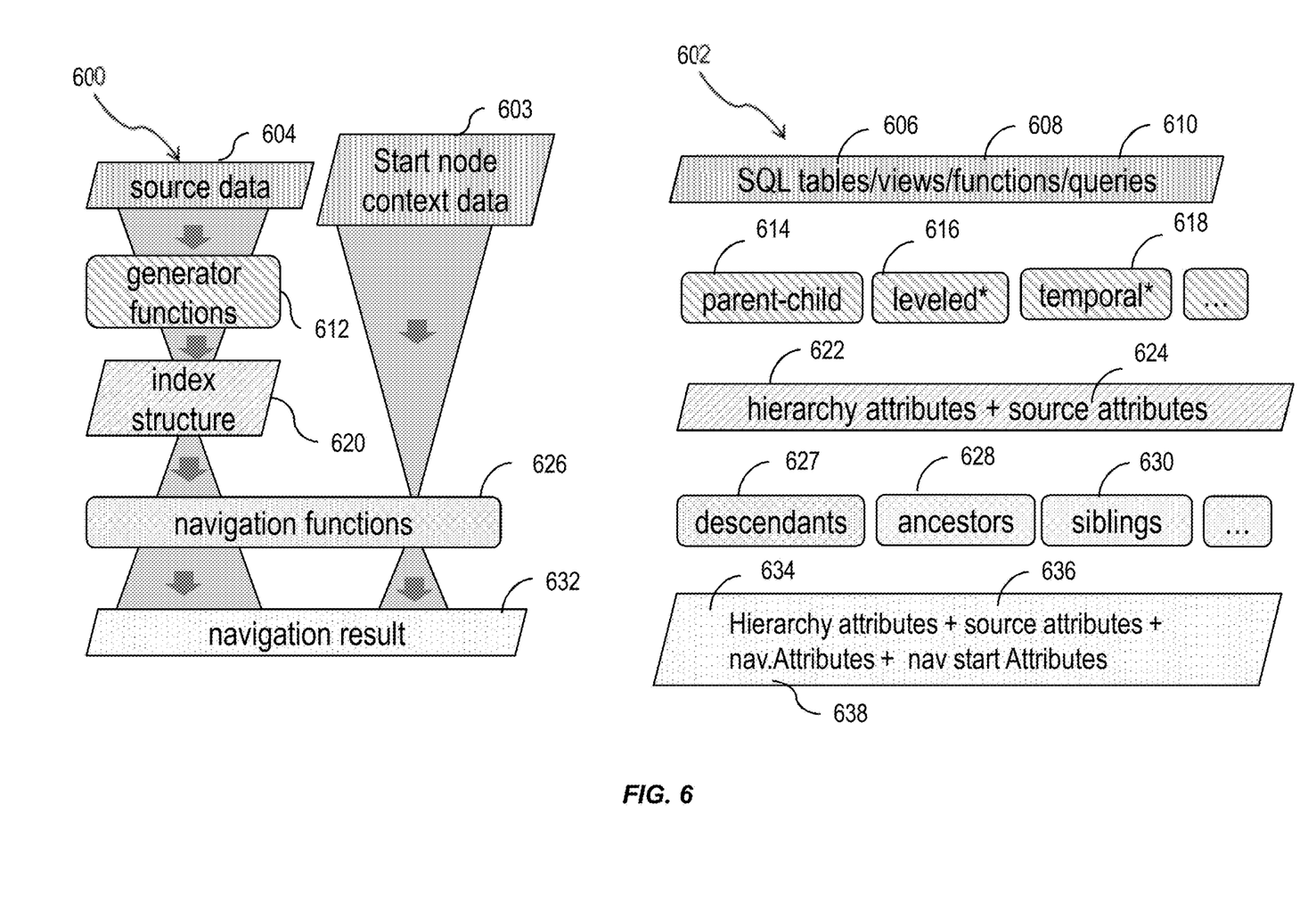
FIG. 6 is a schematic diagram showing an overall design for hierarchical computations in a relational database management system having one or more features consistent with the present description.

FIG. 6 is a schematic diagram showing an overall design 600 for hierarchical computations in a relational database management system having one or more features consistent with the present description. The left hand side shows the conceptual elements and the dataflow between them—the right hand side shows examples for the corresponding concepts.

The design 600 provides for the separation of hierarchy functions into individual processing steps that each have clearly defined tasks. Additionally, the design 600 allows for the specification of one or more start node attributes for hierarchy navigation functions, referred to as start node context data 603.

At the source data step 604 a user can semantically describe the source structure. This is instead of a user having to define an algorithm used to calculate hierarchical attributes. The user can semantically describe the tables or views 606, the table SQL functions 608, including generic SQL table functions, any ad hoc queries 610, or the like. The source data step 604 can include support for various source data formats. The source data step 604 can be designed to take extensibility into consideration.

At the generator functions step 612, one or more hierarchical relationships can be generated. For example, parent-child relationships 614 can be defined, whether the hierarchy is leveled 616 can be defined, whether the hierarchy is temporal 618 can be defined, or the like. The generator functions 612 can be provided in an extensible layer configured to facilitate the addition of other generator functions. Users of the database system can build their own generator functions.

The index structure 620 can include a normalized tabular index structure. The index structure 620 can consist of a single tabular structure having mixed semantics encoding both edge and vertex information, subsumed by the general concept of hierarchy node information. The index structure 620 can include an abstraction and/or normalization layer for each of the source formats supported by the hierarchy design 600. The index structure 620 can include a minimal set of default hierarchical attributes 622. Hierarchical attributes 622 can include the rank of a node, the level of a node, the tree size of the hierarchy, the number of child nodes, or the like. The index structure 620 can include variable user-definable projection of source attributes 624. The source attributes 624 can include node ID, parent node reference, and/or one or additional variable user-defined attributes. For example, an employee hierarchy source table may contain additional general employee attributes such as age, address, work title, and so on.

The navigation functions 626 can consume the index structure 620. The navigation functions 626 typically operate only on the hierarchical attributes 622 of the index structure 620, but are usually capable of laterally appending all input attributes to the function output. The navigation functions 626 can include a set of specialized functions for hierarchy navigation. The navigation functions 626 can include one or more filters, including a distance filter, a leaves filter, a branch filter, or the like. The hierarchy functions 626 can facilitate traversal of the hierarchy in an arbitrary direction. The hierarchy functions 626 can facilitate chaining by nesting nodes. The hierarchy functions 626 can be configured to inspect start conditions of the hierarchy traversal. Users of the database system can build their own navigation functions 626. Navigation functions 626 can be associated with descendants 627, ancestors 628, siblings 630, or the like.

The navigation result 632 can be provided. The navigation result 632 can include the distance between a start node and a result node of a traversal of the hierarchy. The navigation result 632 can facilitate determination of how a particular node was reached based on the start conditions of the hierarchy traversal. The navigation result 632 can include one or more of hierarchical attributes 634, source attributes 636, navigation attributes 638, or the like.

Figure 7:
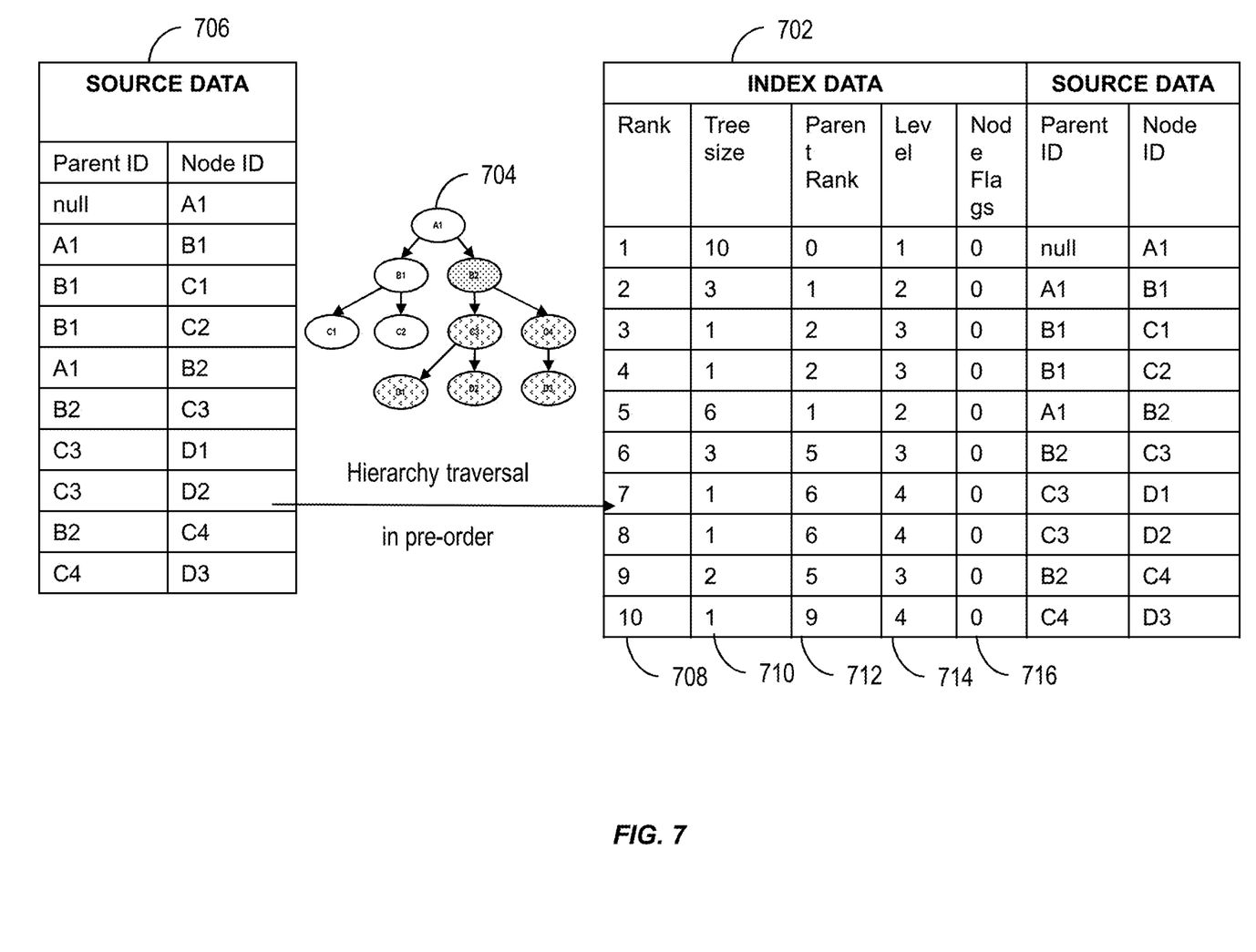
FIG. 7 illustrates index data generated from a hierarchy generated from source data, the hierarchy results generated using a generic hierarchy generation SQL function, consistent with one or more features of the present description.

FIG. 7 illustrates index data 702 generated from a hierarchy 704 generated from source data 706, the hierarchy results generated using one or more generic SQL functions, consistent with the present description. The index data 702 illustrated in FIG. 7 is the minimal example of an application of a generic SQL function. The index data 702 include a rank 708, a tree size 710, a parent rank 712, a level 714, flags 716, or the like.

Figure 8:
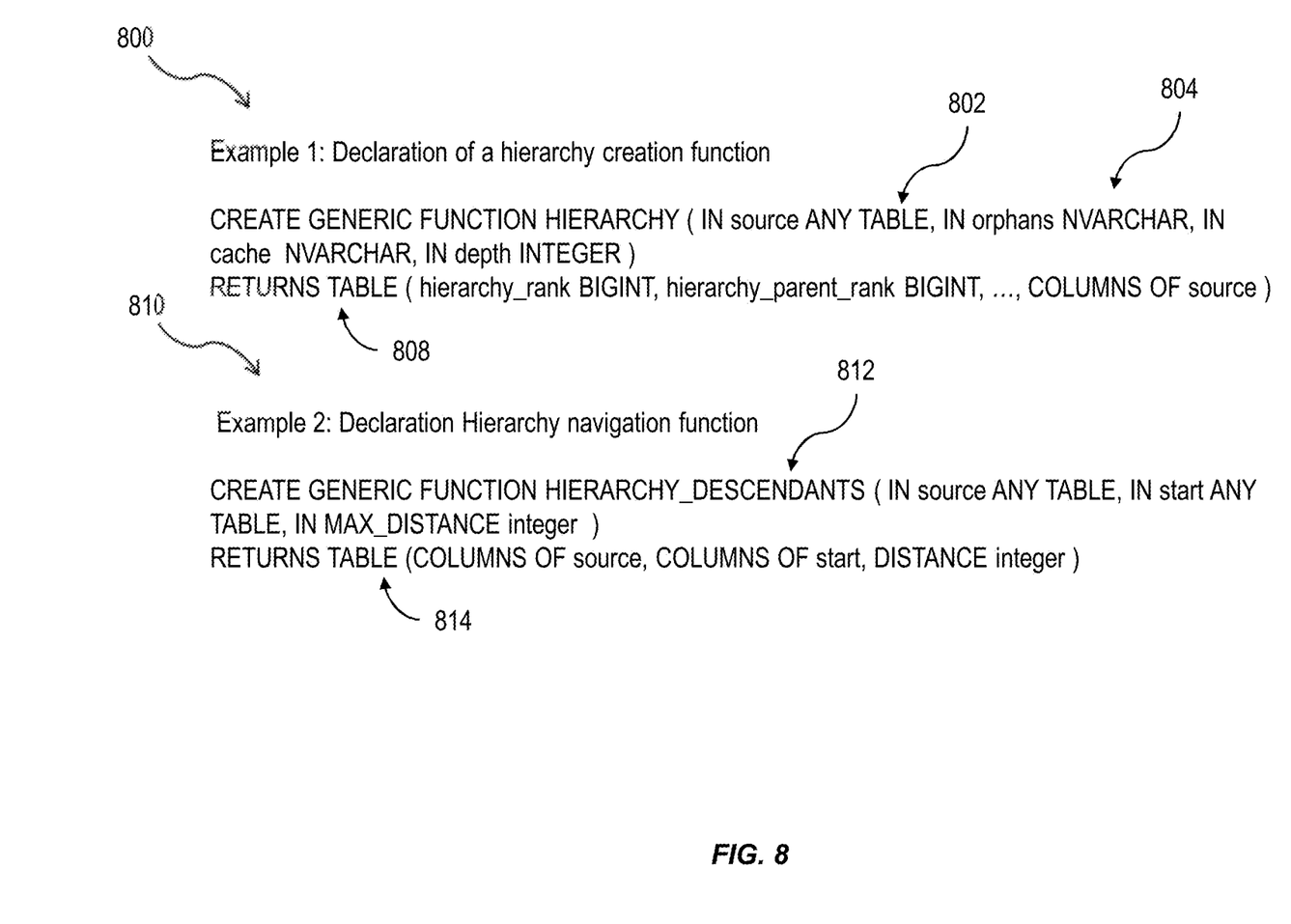
FIG. 8 is an illustration of a declaration of a generic hierarchy generator SQL function and a declaration of a generic hierarchy navigation function, both having one or more features consistent with the present description.

FIG. 8 is an illustration of a generic hierarchy generator SQL function 800 having one or more features consistent with the present description. The input parameters for the generic SQL function 800 include a call to a generic table 802, and one or more generic input parameters 804. The generic hierarchy generator SQL function 800 can include a generic return parameters 806. The generic return parameters 806 can include one or more attributes derived from the generic input table 802 and/or the generic parameters 806.

FIG. 8 also illustrates a generic declaration of a hierarchy navigation function 810 having one or more features consistent with the present description.

There are many possible varied input parameters into the above described generic SQL functions. Users can implicitly customize the various input parameters at SQL function call time simply by passing values to the parameters.

Figure 9:
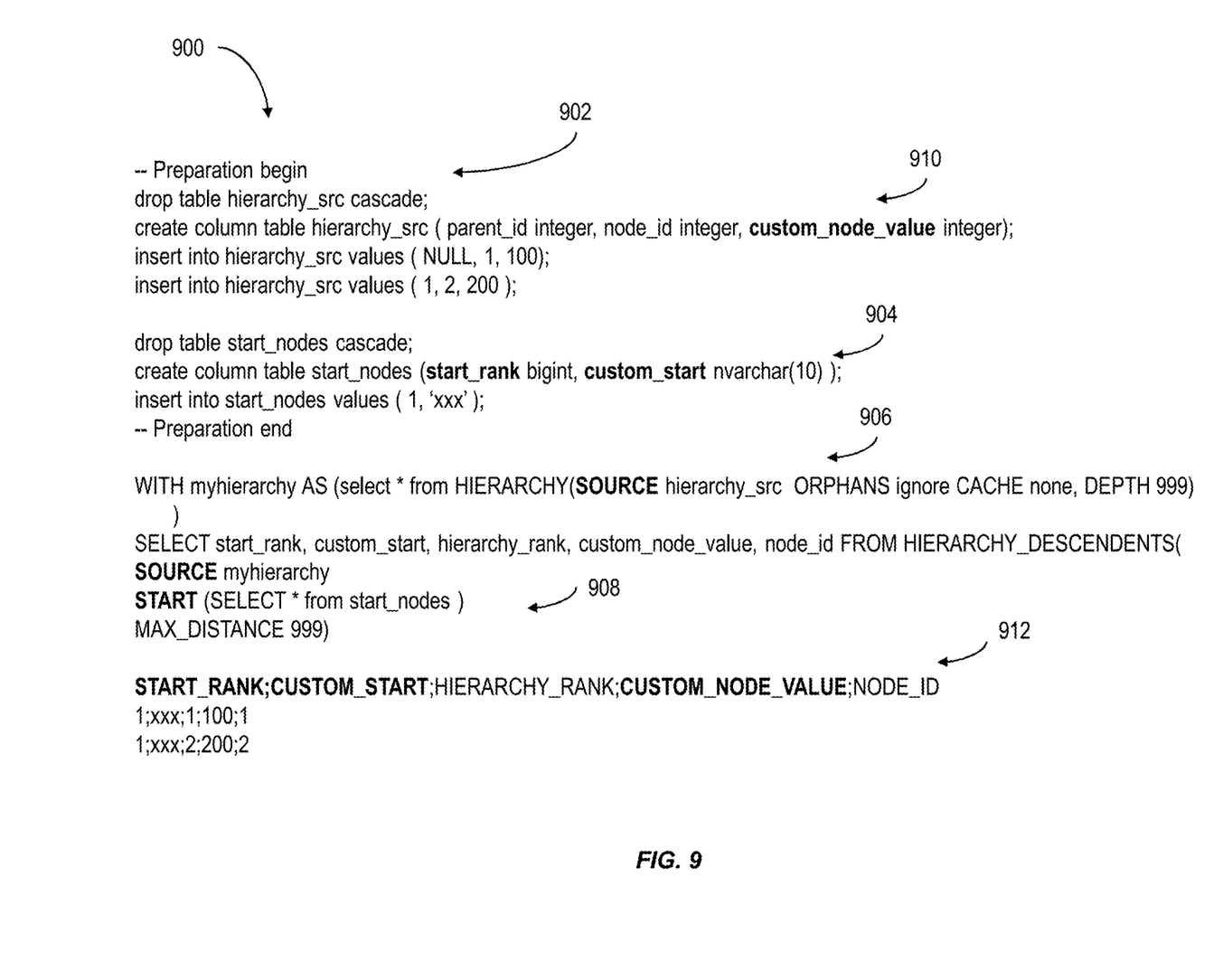
FIG. 9 is an illustration of the usage of generic hierarchy SQL function, having one or more features consistent with the present description.

FIG. 9 is an illustration of the usage of generic hierarchy functions 906 and 908, having one or more features consistent with the present description. Generic hierarchy SQL function 908 is provided as an example of a generic SQL function that includes two elements of the presently described subject matter. Both of its parameters SOURCE and START are generic. The function call syntax is the same as for calling non-generic SQL functions.

At 902, preparation of the input data for the calls of the generic hierarchy SQL functions 906 and 908 can begin.

At 904, a "helper table" can be generated that is configured to specify the start node of a hierarchy navigation as well as custom attributes for the start node. The columns of the helper table are taken over into the result set of the hierarchy navigation 912, as demanded by the rules specified in the definition of HIERARCHY_DESCENDANTS 814.

At 906, a hierarchy is created by calling the SQL function HIERARCHY, Because of one or more features described herein, the generic SQL function HIERARCHY can be flexible and used on any data source having any data type. In the current example, the source is the table named hierarchy_src, which includes a custom attribute column named custom_node_value 910. This column is taken over into the resultset of the HIERARCHY function call (not shown in the figure). This resultset is afterwards used as input for the call to the HIERARCHY_DESCENDANTS function 908 using generic input parameter SOURCE. Because the SOURCE input parameter of HIERARCHY_DESCENDANTS is also generic, the custom_node_value column appears also in the overall resultset 912.

The generic SQL function HIERARCHY_DESCENDENTS 908 has a function signature 812. The function can be configured to be signature-generic. The function signature can require two distinguished table value parameters SOURCE and START which can serve as input into the generic SQL function and which can define the result set, columns, and datatypes of the data of the output table(s). Consequently, the result set, columns, and datatypes of the output data are also signature-generic. The function signature 812 can include additional fixed input parameters like MAX_DISTANCE 812 that influence computation, but not the resultant signature of the data. The function signature can include additional fixed output parameters. In the example the output column DISTANCE 812.

The basic signature of hierarchy navigation SQL functions include, as input, the hierarchy as a list of nodes and one or more start node IDs. The hierarchy as a list of nodes can be generated from the output of "hierarchy( )" in the generic SQL hierarchy function 900. The basic signature of hierarchy navigation, as output, can include n result nodes and/or edges. Examples of output can include children nodes, subtrees, sibling nodes, and parent nodes.

The SQL functions having generic signatures allow for the handling of custom attributes provided by database users. For example, the output of the hierarchy( ) call can be dynamic. The output of the hierarchy( ) call can include source columns and therefore the datatype is different for every statement. Furthermore, additional attributes may be defined, resulting in dynamic data identities and/or data types. Therefore, the hierarchy is a table value parameter with potentially unknown sets of attributes.

The custom columns defined by the user need to be maintained and propagated to the result of the query. This avoids having to rejoin the custom attributes after the query has been run. Rejoining custom attributes can be database resource intensive.

A database system can include multiple tables. A table is a collection of related data held in a structured format within a database. A table typically consists of fields, or columns, and rows. In some variations, the cells of the table may include database commands linking to data that is held externally to the database.

A database system can typically include a database management system. The database management system can comprise multiple layers or levels. The different layers can be configured to perform different types of operations. For example, the lowest layer, or physical layer, of a database management system can be configured to perform the actual operations requested by the users of the database management system. At the physical layer, a conceptual instruction provided by a user may have been translated into many instructions that are readable by the database.

A middle layer, or logical layer, can be configured to consolidate external concepts and instructions into an intermediate data structure. The intermediate data structure can be capable of being devolved into the physical instructions for implementation at the physical layer. The logical layer can be configured to provide execution pathways of operations to multiple different databases and/or database tables, in response to instructions received from the top layer, or view layer.

The view layer can be configured to implement applications that are provided to users of the database management system. Database operations can be represented as database access. In some variations, individual databases within a database system can be viewed as the same at this layer, despite differences in content and operation of those individual databases.

In some variations, the view layer can be a calculation engine layer. The calculation engine layer can be configured to facilitate the processing of user queries and requests using diverse calculation operations. When processing queries, having the tables loaded into the main memory of the database management system increases the efficiency at which the database management system can execute queries, improving the optimization of the database management system.

The view layer and the calculation engine layer can be configured to generate tree hierarchies from the underlying source data. Both layers can be configured to facilitate execution of one or more hierarchy functions that facilitate navigating the hierarchy, obtaining information about the hierarchy, or the like.

Figure 10:
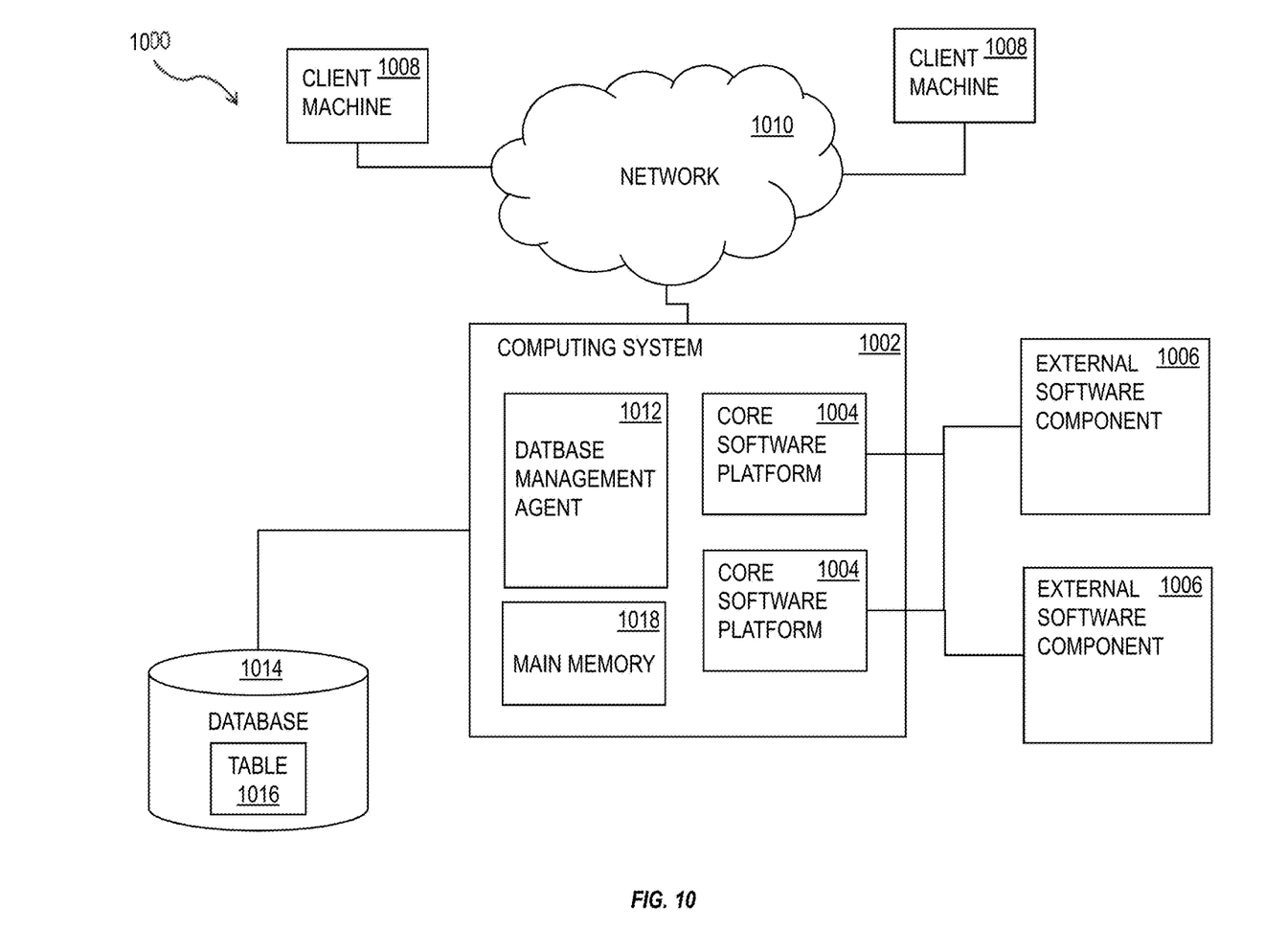
FIG. 10 shows a diagram of a system that can implement one or more features consistent with the present description.

FIG. 10 shows a diagram of a system 1000 that can implement one or more features consistent with the present description. A computing system 1002 can include one or more core software platform modules 1004 providing one or more features of a business software system or other software that includes database management features. The computing system can also aggregate or otherwise provide a gateway via which users can access functionality provided by one or more external software components 1006. One or more client machines 1008 can access the computing system, either via a direct connection, a local terminal, or over a network 1010 (e.g. a local area network, a wide area network, a wireless network, the Internet, or the like).

A database management agent 1012 or other comparable functionality can access a database 1014 that includes at least one table 1016, which can in turn include at least one column. The database management agent 1012 can implement one or more of the features of implementations discussed herein. The database table can store any kind of data, potentially including but not limited to definitions of business scenarios, business processes, and one or more business configurations as well as transactional data, metadata, master data, etc. relating to instances or definitions of the business scenarios, business processes, and one or more business configurations, and/or concrete instances of data objects and/or business objects that are relevant to a specific instance of a business scenario or a business process, and the like.

The database management agent 1012 or other comparable functionality can be configured to load a database table 1016, or other comparable data set, into the main memory 1018. The database management agent 1012 can be configured to load the information from the database 1014 to the main memory 1018 in response to receipt of a query instantiated by a user or computer system through one or more client machines 1008, external software components 1006, core software platforms 1004, or the like. The core software platform(s) 1004 can be configured to facilitate generation of a hierarchy based on a query and/or from one or more tables, or parts thereof, of the database 1014 loaded into the main memory 1018. The core software platforms(s) 1004 can be configured to perform hierarchy functions to facilitate navigation through the hierarchy and/or perform analytics on the hierarchy.

Figure 11:
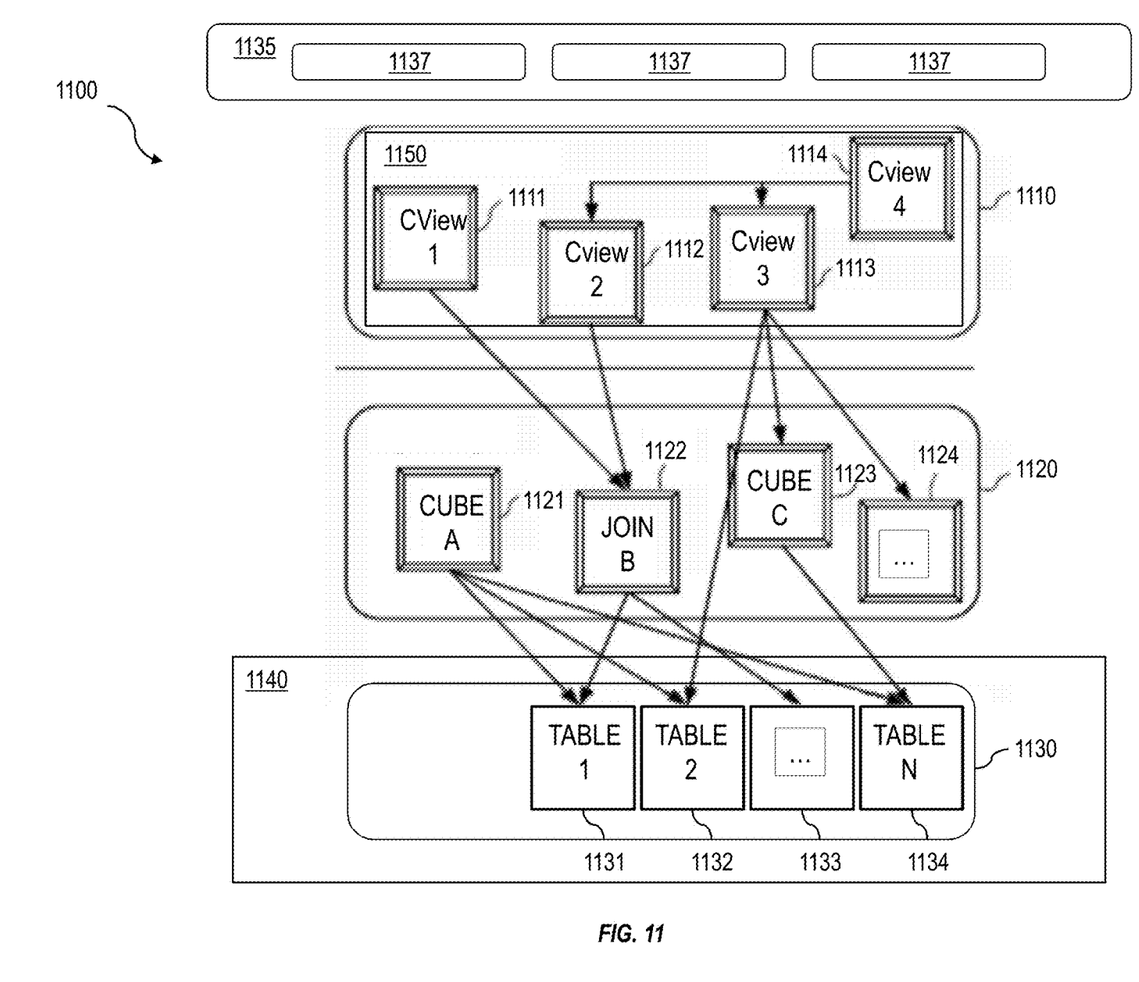
FIG. 11 is a diagram that illustrates a computing architecture implemented in a database system having one or more features consistent with the present description.

FIG. 11 is a diagram that illustrates a computing architecture 1100 implemented in a database system having one or more features consistent with the present description. The computing architecture 1100 can include a database system that includes three layers: a top layer, calculation engine layer 1110, an intermediate layer, or logical layer 1120, and a top layer, or physical table-pool 1130. One or more application servers 1135 implementing database client applications 1137 can access the database system 1000, as shown in FIG. 10. Calculation scenarios can be executed by a calculation engine, which can form part of a database or which can be part of the calculation engine layer 1110 (which is associated with the database). The calculation engine layer 1110 can be based on and/or interact with the other two layers, the logical layer 1120 and the physical table pool 1130. In some variations, the physical table pool 1130 can comprise database operations configured to access and perform the database operations on the individual tables. In some variations, the basis of the physical table pool 1130 consists of physical tables (called indexes) containing the data, which can be stored on one more database servers 1140. Various tables 1131-1134 can be joined using logical metamodels 1121-1124 defined by the logical layer 1120 to form an index. For example, the tables 1131-1134 in a cube (e.g. an online analytical processing or "OLAP" index) can be assigned roles (e.g., fact or dimension tables) and joined to form a star schema. It is also possible to form join indexes (e.g. join index B 1122 in FIG. 3), which can act like database views in computing environments such as the Fast Search Infrastructure (FSI) available from SAP SE of Walldorf, Germany. Hierarchy functions can be configured to define hierarchical relations and to process source data from the physical table layer 1130, from the logical layer 1120, and the calculation layer 1110. Hierarchy functions can also be called from the calculation layer 1110.

A calculation scenario 1150 can include individual nodes (e.g. calculation nodes) 1111-1114, which in turn can each define operations such as joining various physical or logical indexes and other calculation nodes (e.g., CView 4 is a join of CView 2 and CView 3). That is, the input for a node 1111-1114 can be one or more physical, join, or OLAP indexes or calculation nodes. A calculation node as used herein represents a operation such as a projection, aggregation, join, union, minus, intersection, and the like. Additionally, as described below, in addition to a specified operation, calculation nodes can sometimes be enhanced by filtering and/or sorting criteria. In some implementations, calculated attributes can also be added to calculation nodes.

Figure 12:
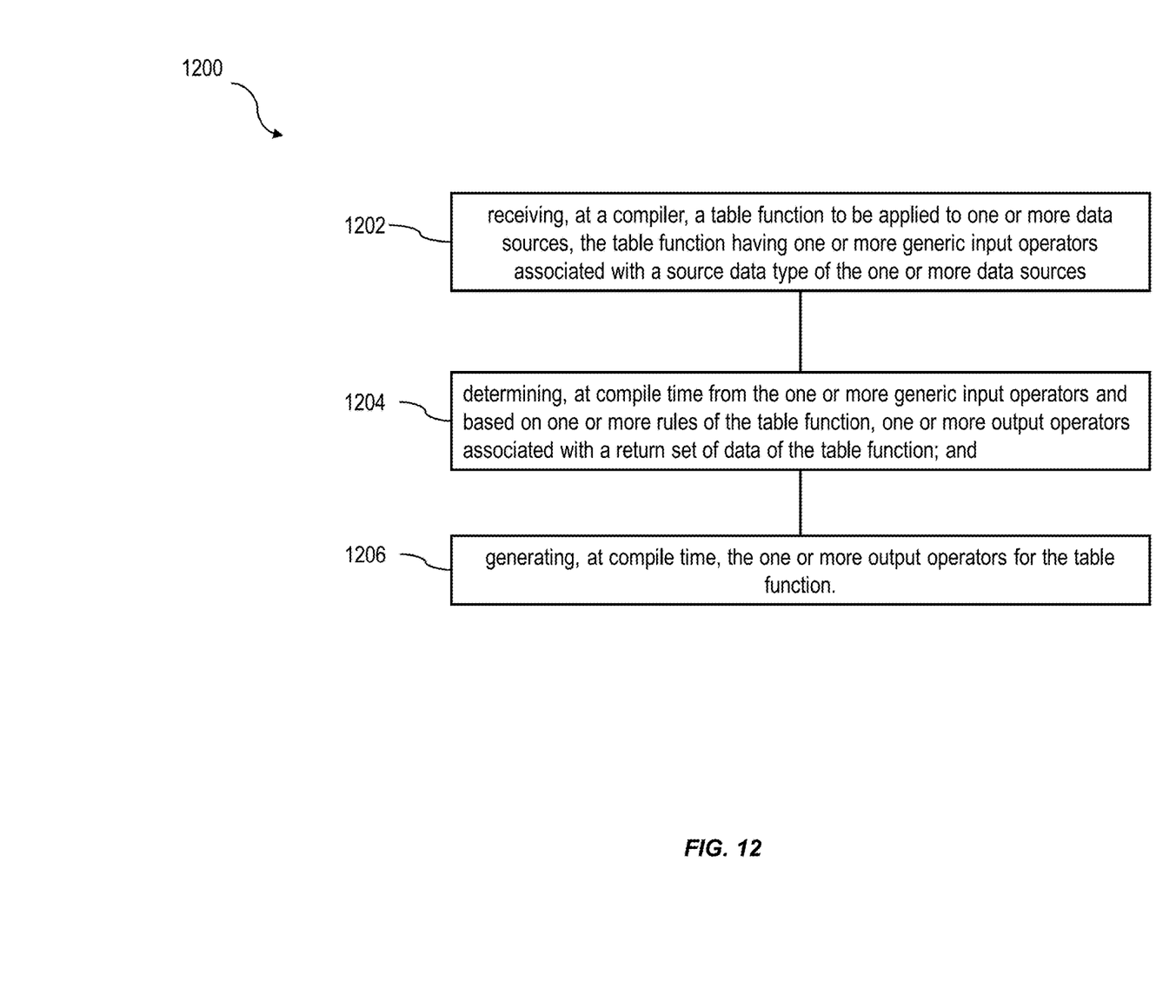
FIG. 12 is a process flow diagram illustrating a method having one or more features consistent with the present description.

FIG. 12 is a process flow diagram 1200 illustrating a method having one or more features consistent with the present description.

At 1202, a table function is received. The table function can be received at a compiler of a database system, such as database system 1000 illustrated in FIG. 10. The table function can be applied to one or more data sources. The data sources can be data sources maintained by the database system 1000. The table function can have one or more generic input operators associated with a source data type of the one or more data sources. The table function can be a SQL table function.

At 1204, one or more output operators can be determined. The one or more output operators can be associated with a return set of data of the table function. The one or more output operators can be determined at compile time by a compiler. The one or more output operators can be determined from the one or more generic input operators and based on one or more rules of the table function.

At 1206, the one or more output operators for the table function can be generated. The one or more output operators can be generated at compile time.

The table function can be configured to be generic as to data source type and data source output.

In some variations, the output of the table function can include a hierarchy of descendant nodes of the start node. The table function can be a hierarchy navigation function, a hierarchy generator function, or the like.

The table function can be configured to allow customization of one or more input parameters of the table function.

In some variations, a node hierarchy can be traversed in accordance with the hierarchy navigation function.

Without in any way limiting the scope, interpretation, or application of the claims appearing herein, a technical effect of one or more of the example embodiments disclosed herein may include providing enhanced flexibility to table functions by making table functions generic as to the type of source data. This allows database engineers to develop customized functions that can be applied to any data type and negates the need to specify the input data type or identity for each application of the customized table function.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method to be performed on one or more data processors comprising at least part of a computer system, the method comprising:
   receiving, at a database system, a generic table function applicable to a plurality of types of data sources, the generic table function comprising a hierarchy navigation function having a function signature, the function signature including one or more fixed input parameters and one or more generic input operators, wherein the one or more generic input operators comprise a call to at least one generic table having a generic data type, and further wherein the one or more generic input operators are defined irrespective of source data type of the plurality of types of data sources;
   determining, at a compile time for the generic table function and based on the function signature, one or more output operators associated with a return set of data of the generic table function, wherein the one or more output operators are determined based on an identity and/or a data type of elements in the return set of data, and wherein the one or more output operators are further based on one or more rules specified in the generic table function, the one or more rules defining how the one or more output operators are derived from the one or more fixed input parameters and the one or more generic input operators; and
   generating, at compile time for the generic table function, the one or more output operators for the generic table function.

2. The method of claim 1, wherein the generic table function is a Standard Query Language (SQL) table function.

3. The method of claim 1, wherein the generic table function generates a start node table defining the start node for a navigation through a hierarchy of nodes.

4. The method of claim 3, wherein an output of the generic table function includes a hierarchy of descendant nodes of the start node.

5. The method of claim 1, wherein the generic table function is a hierarchy generator function.

6. The method of claim 1, wherein the generic table function is configured to allow customization of one or more input parameters of the generic table function.

7. The method of claim 1, further comprising:
   traversing a node hierarchy in accordance with the hierarchy navigation function.

8. A system comprising:
   at least one processor; and
   memory storing machine-readable instructions, which, when executed by the at least one processor, cause the at least one processor to perform operations comprising:
      receiving, at the at least one processor, a generic table function applicable to a plurality of types of data sources, the generic table function comprising a hierarchy navigation function having a function signature, the function signature including one or more fixed input parameters and one or more generic input operators, wherein the one or more generic input operators comprise a call to at least one generic table having a generic data type, and further wherein the one or more generic input operators are defined irrespective of source data type of the plurality of types of data sources;
      determining, at compile-time for the generic table function and based on the function signature, one or more output operators associated with a return set of data of the generic table function, wherein the one or more output operators are determined based on an identity and/or a data type of elements in the return set of data, and wherein the one or more output operators are further based on one or more rules specified in the generic table function, the one or more rules defining how the one or more output operators are derived from the one or more fixed input parameters and the one or more generic input operators; and
      generating, at compile time for the generic table function, the one or more output operators for the generic table function.

9. The system of claim 8, wherein the generic table function is a Standard Query Language (SQL) table function.

10. The system of claim 8, wherein the generic table function generates a start node table defining the start node for a navigation through a hierarchy of nodes.

11. The system of claim 10, wherein an output of the generic table function includes a hierarchy of descendant nodes of the start node.

12. The system of claim 8, wherein the generic table function is a hierarchy generator function.

13. The system of claim 8, wherein the generic table function is configured to allow customization of one or more input parameters of the generic table function.

14. The system of claim 8, wherein the operations further comprise:
   traversing a node hierarchy in accordance with the hierarchy navigation function.

* * * * *